L. S. STARRETT.

Try Square.

No. 9,419. Reissued Oct. 19, 1880.

Witnesses:
S. N. Piper,
Wm. W. Lunt.

Inventor:
Laroy S. Starrett.
by attorney,
R. H. Eddy.

UNITED STATES PATENT OFFICE.

LAROY S. STARRETT, OF ATHOL, MASSACHUSETTS.

TRY-SQUARE.

SPECIFICATION forming part of Reissued Letters Patent No. 9,419, dated October 19, 1880.

Original No. 215,024, dated May 6, 1879. Application for reissue filed July 6, 1880.

*To all whom it may concern:*

Be it known that I, LAROY S. STARRETT, of Athol, of the county of Worcester and State of Massachusetts, have invented a new and useful Improvement in Try-Squares; and I do hereby declare the same to be described in the following specification, and represented in the accompanying drawings, of which—

Figure 1:
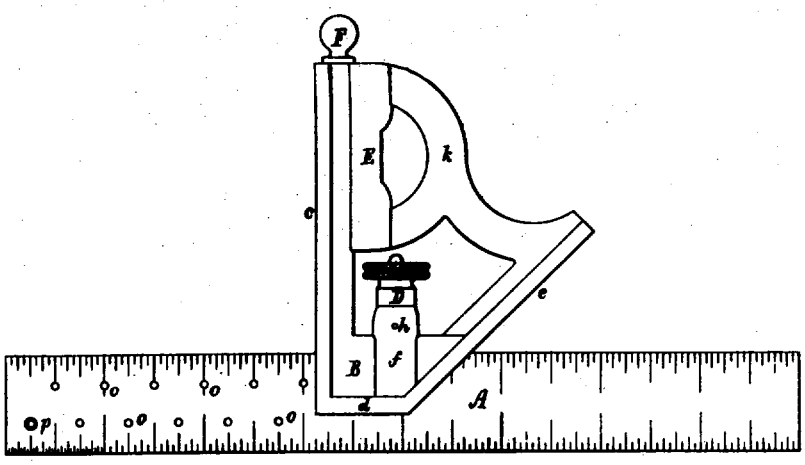
Figure 2:
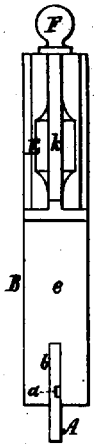
Figure 4:
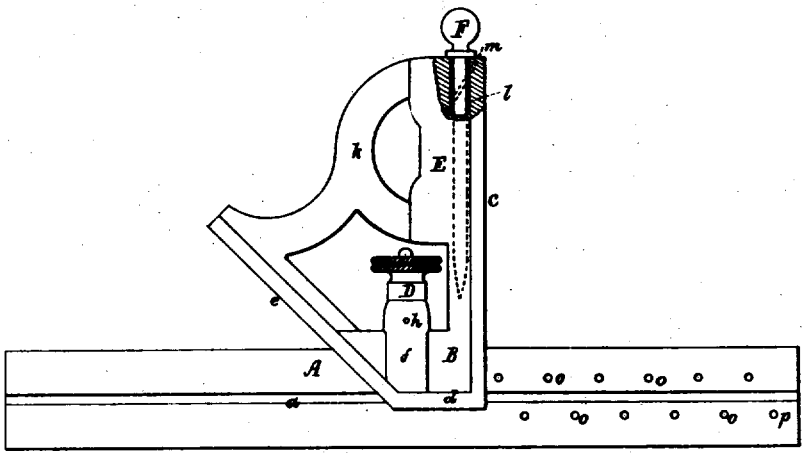
Figure 3:
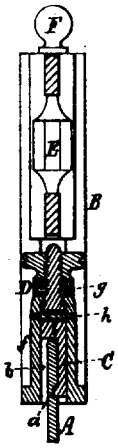

Figure 1 is a side elevation, Fig. 2 an end view, and Fig. 3 a transverse section, of a try-square of my improved kind. Fig. 4 is a rear elevation of it.

The nature of my invention is duly set forth in the claims hereinafter presented.

In the drawings, A denotes a graduated steel rule or bar having extended through it lengthwise on one side of it a long groove, *a*, which is rectangular in its transverse section. This bar enters and slides in a recess, *b*, formed in the foot or lower part of a stock, B, one edge, *c*, of which is at a right angle to its lower edge, *d*, while the other, *e*, is at an angle of forty-five degrees with such lower edge.

Within a socket opening into the recess, and made in a boss, *f*, arranged in the stock, as represented, there is a clamp-hook, C, formed to engage with the groove of the bar A, and provided with a nut, D, that is screwed on the shank of the clamp, and is counterbored, and has within it a helical spring, *g*, to bear on the top of the boss, and to serve, when the nut is loosened, to draw the clamp upward, so as not only to prevent the bar from falling out of place in the stock, but dirt or extraneous matters from working between the bar and the top of the recess in which such bar is placed, and thereby throw the bar out of its right-angular position to the edge *c* of the stock. A pin, *h*, inserted in the boss and projected into a hole, *i*, in the shank of the clamp, prevents the clamp from revolving in the boss. The foot of the clamp extends into the recess and the groove of the bar A. Furthermore, there is within the stock, and parallel to its edge *c*, a spirit-level, E, which is protected by an arch, *k*, extending lengthwise over it, as shown. The stock is also provided with a socket, *l*, to receive a stylus or scratch-pin, F, which, by a friction-spring, is prevented from accidentally dropping out of the socket.

The rule or bar, besides having at its opposite edges divisions or lines indicating inches and equal parts thereof, has made through it several holes, *o*, a half an inch or other suitable distances apart from each other, from center to center, each being of proper diameter to allow the point of the awl or scratch-pin to be extended into and through it far enough to make gage-marks when it may be desirable to use the instrument for laying out work or mortises or tenons.

One or more holes, *p*, near the end of the bar may be countersunk, to admit of the point of a lead-pencil being introduced through either, and used instead of a scratch-pin for making gage-marks.

The working-edges *c e* of the stock are placed far enough apart for the bottom upper edge of the bar-recess to be long enough to afford a suitable bearing for the bar, and also to admit of the boss being made between them, whereby the clamp is not only covered and protected on all sides and shielded from dust or extraneous matters, but is prevented from accidentally slipping sidewise out of the groove in the bar.

In the above-described try-square it will be seen that the clamp-hook C is arranged between the vertices of the angles of the lower edge, *d*, and the bearing-edges *c* and *e* of the stock, whereby it in no respect projects through the bevel-edge *e* and over and upon the bar A so as to be an obstacle to the bar being laid flatwise on an object when in contact with the said bevel-edge. This arrangement of the clamp-hook saves any necessity of any extension of the stock from the bevel-edge in the angle between it and the upper edge of the bar and down to such edge in order to give proper support to the bar.

I do not claim, broadly, a slide-bar and a stock therefor having edges arranged at an angle of forty-five degrees to each other, one of them being at a right angle to the bar; but

What I claim as my invention is as follows:

1. The screw-clamp arranged in the stock and bar receiving recess and between the vertical and bevel edges *c e* of the stock, all being substantially as set forth.

2. The screw-clamp arranged in the stock and the bar-receiving recess and between the vertical and bevel edges *c e* of the stock, and having the helical spring and counterbored nut arranged in the stock, substantially as set forth.

3. The stock provided with the spirit-level and its guard-arch, the rule-receiving recess, and the clamping-screw and nut-supporting boss or device arranged as set forth.

4. The stock provided with the scratch-pin sheath, the spirit-level and its guard-arch, and the clamping-screw and nut-supporting boss or device, arranged as set forth.

5. The screw-clamp C, arranged between the vertices of the angles of the lower edge, *d*, and the bearing-edges *c* and *e* of the stock, and projected into a groove in the rule or bar adapted to said stock, substantially as specified.

6. The stock provided with the clamp-screw, receiving-boss, or sustaining device *f*, arranged so as to cause the clamp C, when therein, to be between the vertices of the angles of the lower edge, *d*, and the bearing-edges *c* and *e* of the stock, all being substantially as set forth.

7. The stock provided with the spirit-level glass-receiving sheath, formed or cast in one piece with the remainder of the stock.

8. The stock provided with the spirit-level glass-receiving sheath and its guard-arch, formed or cast in one piece with the rest of the stock.

9. The rule or bar provided with the series of holes, as described, in combination with the stock having its clamp-screw arranged between the vertices of the lower edge, *d*, and the bearing-edges *c* and *e* of such stock.

LAROY S. STARRETT.

Witnesses:
CHS. FIELD,
JOHN GATELY, Jr.